Oct. 12, 1965  J. VAN GIJZEN  3,211,702
PREPARATION OF POLYESTERS FROM A CYCLIC ESTER OF AN
ALIPHATIC GLYCOL AND AN ORGANIC
DICARBOXYLIC ACID ANHYDRIDE
Filed Nov. 21, 1961
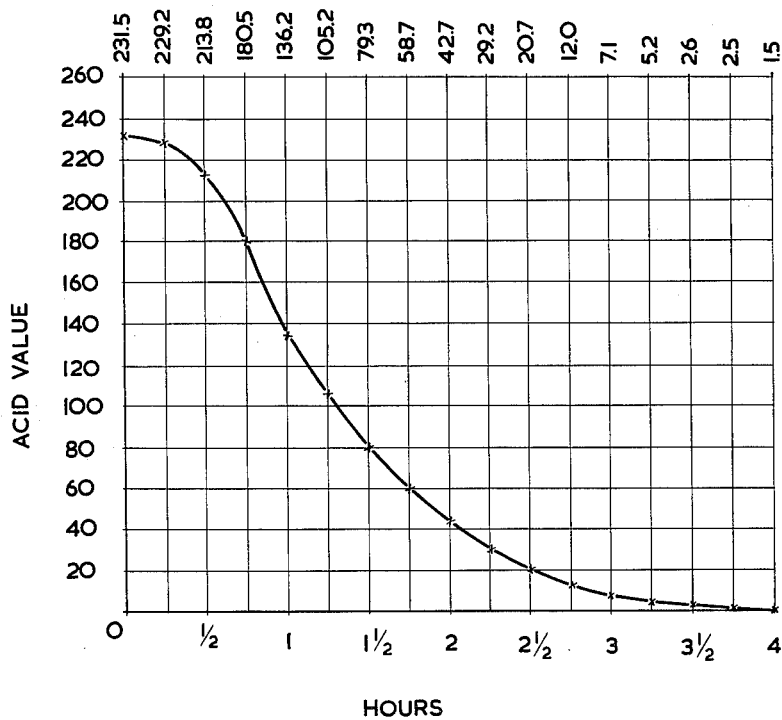
INVENTOR
Jacob Van Gijzen
BY Connolly and Hutz
ATTORNEYS 3,211,702
PREPARATION OF POLYESTERS FROM A CYCLIC ESTER OF AN ALIPHATIC GLYCOL AND AN ORGANIC DICARBOXYLIC ACID ANHYDRIDE
Jacob van Gijzen, Vlaardingen, Netherlands, assignor to Fabriek van Chemische Producten Vondelingenplaat N.V., Rotterdam, Netherlands, a corporation of Dutch law
Filed Nov. 21, 1961, Ser. No. 153,856
Claims priority, application Netherlands, Nov. 24, 1960, 258,336/60
7 Claims. (Cl. 260—77.5)

The invention relates to polyesters and a process for preparing the same.

It is known that polyesters can be prepared by esterification of dibasic acids or their anhydrides with bivalent or polyvalent alcohols. As usual, in similar reactions, an excess of alcohol is used. The excess of alcohol is generally removed by distillation under reduced pressure together with the water formed in the reaction. Frequently, the process has to be carried out in an inert atmosphere, to avoid degradation or decomposition of the polyesters. Moreover special provisions are required to impart to the polyester certain desirable properties, such as a low acid value.

U.S. patent specification 2,822,350 describes a process for the preparation of polyesters, by reacting acid anhydrides with an epoxy alkane. This process has the disadvantage that the reaction with the very dangerous epoxy alkanes has to be carried out in a kettle, being resistant to a moderately increased pressure, while observing various safety measures. Furthermore the reaction times are rather long (about 20 hours). Since this reaction is an exothermic process, certain measures are required to keep the temperature within the desirable range. Moreover the only epoxy alkanes that can be used according to this process are epoxy ethane, epoxy propane, and epoxy butane.

U.S. patent specification 2,448,767 describes the hydroxyethylation of organic compounds containing at least one reactive hydrogen atom, by reaction with ethylene carbonate or ethylene sulfite. The ethylene carbonate or ethylene sulfite reacts with the compound containing the reactive hydrogen atoms, upon heating to 110°–200° C., with evolution of $CO_2$ or $SO_2$.

In Kirk-Othmer, Encyclopedia of Chemical Technology, Part 13, p. 509, it is mentioned that the hydrogen of phenolic hydroxyl or amino groups may be substituted by hydroxyethyl with the aid of ethylene sulfite or ethylene carbonate.

In Journal of the American Chemical Society 69, 1952–6 (1947) and the Dutch patent specifications 85,671 and 89,751 reactions with glycol carbonate and glycol sulfite are described. In these reactions the cyclic esters have a hydroxyethylating effect, with evolution of carbon dioxide or sulphur dioxide, i.e., in a similar way to an epoxy alkane. In all these reactions the presence of a reactive hydrogen atom is essential.

Now it was found that the above-mentioned polyesters can be prepared also, in reacting anhydrides of dibasic or polybasic acids with cyclic esters of aliphatic diols and polybasic inorganic volatile acids, in the presence of conventional catalysts.

In the preparation of linear polyesters the condensation proceeds according to the equation

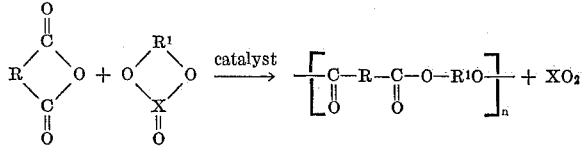

in which R represents a substituted or a non-substituted alkylene, alkylidene, or arylene radical, or hydrogenation products thereof, $R^1$ a substituted or a non-substituted alkylene radical containing not more than 8 carbon atoms, and X a carbon atom or a sulphur atom.

For the preparation of cross-linked polyesters it is necessary to start from anhydrides containing also other groups capable of being reacted with the cyclic esters (such as trimellitic acid anhydride), or dianhydrides (such as pyromellitic acid dianhydride) or cyclic esters containing more than one hetero nucleus (such as pentaerythritol disulfite, glycerol tricarbonate, etc.)

Obviously it is also possible to start from mixtures of acid anhydrides and mixtures of cyclic esters. For unsaturated polyesters, addition of styrene to the final product may bring about the desired cross-linking.

On the one hand it could not be predicted that this reaction might be carried out in the absence of a reactive hydrogen atom. On the other hand it is surprising that the reaction may be carired out, dependent on the starting materials and the catalyst, between 100° and 220° C., i.e., not only at temperatures at which according to Industrie chimique belge 20, Spec. No. 656–657 the cyclic esters might be reacted into the corresponding epoxy alkanes, but also at temperatures at which this reaction according to said publication cannot take place. From the fact that the present reaction can be effected at temperatures above as well as below 180° C., in shorter and longer reaction periods respectively, it follows that the cyclic esters in this process are not first reacted into the corresponding epoxy alkanes and only then proceed to react with the acid anhydride, but that a direct reaction of the acid anhydride with the alkylene carbonate or the alkylene sulfite occurs. Again, from the fact that the immediately detectable alkylene oxides were observed in none of the reactions carried out it is evident that no previous decomposition of the alkylene compounds takes place. Another proof of this consists in that, when non-cyclic esters are used, which precludes the formation of cyclic ethers as an intermediate, the reaction also takes place spontaneously.

The process according to the invention has the following important advantages:

1. No excess of the alkylene carbonate or the alkylene sulfite has to be used.
2. During and after the reaction no distillation is required.
3. The reaction can be effected in a short time.
4. An inert atmosphere is obtained without special measures because such an atmosphere is produced automatically by the $CO_2$ or $SO_2$ evolution during the reaction.
5. The equipment for carrying out the reaction can be very simple.
6. The desired acid value of the final product may be obtained in a very simple way.

For carrying out the process according to the invention a simple reaction kettle, equipped with controllable heating devices and an agitation device is required. A reflux condenser is desirable. In practice a small excess of the cyclic ester is generally used to compensate for any losses of particles which are removed together with the escaping gases. The reaction kettle needs not to be resistant to increased pressure or to sub-atmospheric pressure.

The duration of the reaction is short and consequently the reaction can be completed easily within two hours or less. The temperature of the reaction, depends on the starting materials and the catalyst and lies between 100 and 220° C. The reaction rate is highly dependent on the temperature; thus a reaction which proceeds too rapidly at 180° C. may be carried out in a longer reaction time at 120° C. Thus a mixture of 1 mol of phthalic acid anhydride, 1 mol of ethylene carbonate, and 1% by weight of trinonyl amine is condensed at 150°, 160°, and 170° C. respectively. The acid value of the starting mixture was 225. The acid values alter during the condensations in the following way

|  | 150° C. | 160° C. | 170° C. |
|---|---|---|---|
| 1½ hours | 215 | 169 | 79 |
| 2 hours | 189 | 139 | 43 |

Acid anhydrides that can be used, for instance, for the preparation of the polyester according to the invention are succinic anhydride, phthalic anhydride, diphenic anhydride, naphthalic anhydride, tetrahydrophthalic anhydride, and maleic anhydride, and their substitution products. Suitable cyclic esters of diols with volatile polybasic inorganic acids, for instance, are ethylene carbonate, 1,2-propane diol carbonate, 1,3-propane diol carbonate, 1,2-propane diol sulfite, 1,3-propane diol sulfite, ethylene sulfite, and butane diol sulfite.

In the absence of a catalyst, the reaction proceeds only very slowly, if at all. A lot of catalysts appeared to be suitable for the present reaction. Acid compounds such as sulphuric acid, hydrochloric acid, toluene sulphonic acids, potassium bisulphate, zinc chloride and the like, as well as basic compounds, such as alkali hydroxides and carbonates, pyridine, N-ethyl piperidine, etc., have been found suitable. Good catalysts are also to be found among the salts. Sodium fluoride and potassium iodide may be mentioned as examples. The quantity of the catalyst used may vary from 0.1 to 5% by weight, calculated on the weight of the reaction mixture. The selection of the catalyst may often determine the colour of the final product.

The desired acid value of the final product is obtained in a simple way by means of a proper selection of the temperature and the reaction time. If required, the acid value can be adjusted almost down to zero.

The simplicity and rapidity of the reaction is very well elucidated by reactions for which non-internal anhydrides are used, so that the reaction products are simple esters.

When ethylene carbonate (90 g.) and acetic anhydride (102 g.) are boiled in a flask under reflux and in the presence of 1 g. of anhydrous potassium iodide, the temperature of the reaction mixture meanwhile increasing gradually, after 1½ hours the boiling temperature of diacetyl glycol has been reached. The theoretical quantity of carbon dioxide has then escaped. The yield of diacetyl glycol is quantitative; the refractive index of the reaction product is identical with that mentioned in the literature. The colour is a pale yellow; distillation under reduced pressure yields 97% of a perfectly colourless and water-clear product.

In a similar way the following esters can be prepared. The yields are invariably nearly quantitative, the percentages given refer to the yield after distillation or recrystallization.

Glycol diacetate: 96% from ethylene sulfite and acetic anhydride, in the presence of anhydrous potassium acetate.

Propylene glycol diacetate: 91% from propylene carbonate and acetic anhydride, with potassium bifluoride as catalyst.

Propylene glycol diacetate: 91% from propylene carbonate, acetic anhydride, and potassium bicarbonate.

Dibenzoyl glycol: 93% (from alcohol), starting from ethylene sulfite, benzoic anhydride, and anhydrous sodium carbonate.

Dibenzoyl glycol: 91% from ethylene carbonate, benzoic anhydride, and potassium fluoride.

Glycerol triacetate: 82% from glycerol tricarbonate, acetic anhydride, and potassium fluoride.

Pentaerythritol tetraacetate: 89% from pentaerythritol disulfite, acetic anhydride, and concentrated sulphuric acid.

The resins according to the invention can be used in varnishes, paints, and compositions for moulding, extrusion, and injection-moulding.

*Example I*

A mixture of 0.25 mol of succinic anhydride and 0.25 mol of ethylene sulfite is condensed at a temperature of 180° C. with 0.25 g. of sulphuric acid as catalyst. The reaction time is 1½ hours. A solid, almost colourless polyester having an acid value of 49 was obtained.

*Example II*

1,2-Propylene carbonate was heated for 15 minutes to 220° C. with an equivalent quantity of phthalic acid anhydride, in the presence of 1% by weight of potassium diphthalate as catalyst. The product thus obtained was a pale yellow, highly viscous polyester having an acid value of 7.

*Example III*

A mixture of 49 g. of maleic anhydride and 50 g. of ethylene carbonate was heated for 2 hours to 180° C. in the presence of 0.5 g. of toluene sulphonic acid and 0.5 g. of water. The reaction product thus obtained was a clear, faintly coloured, highly viscous polyester, having an acid value of 50.

*Example IV*

A round-bottom flask equipped with a stirrer, a thermometer, and a reflux condenser is charged with 49 g. of maleic anhydride (0.5 mol), 74 g. of phthalic anhydride (0.5 mol), 120 g. of ethylene sulfite (1.11 mols), and 3 cc. of 5 N sulphuric acid.

The mixture is heated and stirred until $SO_2$ evolution starts (about 110° C.). Then the temperature is maintained between 110° and 120° C., and every 30 minutes the acid value is determined. Towards the end of the reaction the reflux condenser is removed in order to discharge the water of the catalyst from the reaction vessel.

When the acid value has dropped below 50 and the calculated quantity of $SO_2$ has been escaped the polyester is added to 100°–110° C. with stirring in a stream of nitrogen. Then styrene monomer in which 0.003% of tert. butyl pyrocatechol has been dissolved (50 g. of styrene per 100 g. of polyester resin is added as diluent. As soon as a homogeneous solution has been obtained, the resin is rapidly cooled and stored in the dark.

The unsaturated polyester solution thus obtained is a water-clear, perfectly colourless, viscous liquid.

The total process takes about 3 hours.

The cross-linking is brought about by introducing 50 g. of the polyester, admixed with 0.25 cc. of cobalt naphthenate (8% of cobalt metal) and 0.5 g. of benzoyl peroxide, into a mould and allowing this mixture to set for a few hours at about 30° C. The moulding thus obtained is hard and tough.

*Example V*

A mixture of 296 g. of phthalic anhydride, 200 g. of ethylene carbonate, and 4 g. of trinonyl amine is rapidly heated up to 170° C. with stirring. This temperature is subsequently maintained as exactly as possible. In the annexed graph the acid value in respect of the time is represented. The first sample was drawn when the temperature of 170° C. had been reached.

To elucidate extensively the course of the acid value, the temperature was maintained at a somewhat low level. The same condensation, carried out at 180° C., after a reaction time of 1½ hours yielded a polyester, having an acid value of 30.

The final product thus obtained, having an acid value of 1.5, is a clear, faintly coloured polyester of very high viscosity. The saponification number was 586.

Example VI 145 g. of phthalic anhydride (0.98 mol), 75 g. of ethylene carbonate (0.85 mol), and 22.5 g. of pentaerythritol disulfite (0.10 mol) are heated, with stirring, with 5 g. of potassium iodide until the reaction starts. The evolution of gas begins at 140° C., and within 1 hour the temperature is allowed to rise to 180° C. The reaction is then complete. During the whole of the reaction sulphur dioxide escaped, simultaneously with carbon dioxide, so that the possibility of the anhydrides not reacting simultaneously is excluded.

The polyester thus obtained is a resin having a rather high viscosity at 170° C. and solidifying upon cooling. The colour is a straw-yellow, while the acid value is 4.2. The resin melts in a range from 44° C. to 57° C.

Example VII

When the same starting materials as in Example VI are used and 5 g. of lithium bromide is taken as catalyst, the reaction takes place already in a few hours at 125°–130° C. Towards the end of the reaction the temperature has to be raised slightly in order that the reaction mixture may still admit of being stirred properly.

When the calculated quality of gas has escaped, a colourless polyester with acid value 15.5 and melting range 42°–54° C. results.

Example VIII 14.8 g. of phthalic anhydride and 13.6 g. of 1,3-butylene sulfite are condensed with 0.5 g. of dry lithium bromide as catalyst, the temperature being allowed to rise from 130° to 180° C. within a few hours.

When the reaction is complete, the sulphur dioxide atmosphere is replaced by nitrogen and the highly viscous polyester is removed.

The colour of the hard resin thus obtained is a light brown, the acid value is 29.5.

What I claim is:

1. A process for the preparation of a polyester which comprises directly reacting in the absence of the reaction-participating water an anhydride of an organic dicarboxylic acid with a member selected from the group consisting of a cyclic carbonic acid ester of an aliphatic diol and a cyclic sulfurous acid ester of an aliphatic diol in the presence of a catalyst.
2. The process of claim 1 wherein the member is a cyclic carbonic acid ester of an alkylene diol.
3. The process of claim 1 wherein the member is a cyclic sulfurous acid ester of an alkylene diol.
4. The process of claim 2 wherein the anhydride has the following structural formula

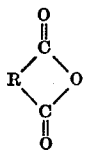

R being alkylene.

5. The process of claim 2 wherein the anhydride has the following structural formula

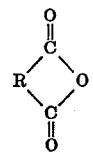

R being a phenyl radical.

6. The process of claim 3 wherein the anhydride has the following structural formula

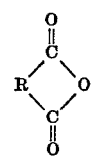

R being alkylene.

7. The process of claim 3 wherein the anhydride has the following structural formula

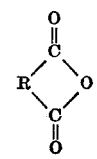

R being a phenyl radical.

References Cited by the Examiner

UNITED STATES PATENTS

| | | | |
|---|---|---|---|
| 2,448,767 | 9/48 | Carlson | 260—77.5 |
| 2,799,667 | 7/57 | Drewitt | 260—77.5 |
| 2,808,390 | 10/57 | Caldwell | 260—77.5 |
| 2,822,350 | 2/58 | Hayes | 260—78.4 |
| 2,870,124 | 1/59 | Ham | 260—78.4 |

OTHER REFERENCES

"Macromolecular Chemie," vol. 51, pages 53–69 (1962).

LEON J. BERCOVITZ, *Primary Examiner.*

NORMAN G. TORCHIN, *Examiner.*